(12) United States Patent
Yu et al.

(10) Patent No.: US 10,759,092 B2
(45) Date of Patent: *Sep. 1, 2020

(54) METHODS OF MAKING HIGH TEMPERATURE ELASTIC COMPOSITES

(71) Applicants: Chengjiao Yu, Houston, TX (US); Zhiyue Xu, Cypress, TX (US); Xiao Wang, Houston, TX (US); Goang-Ding Shyu, Houston, TX (US)

(72) Inventors: Chengjiao Yu, Houston, TX (US); Zhiyue Xu, Cypress, TX (US); Xiao Wang, Houston, TX (US); Goang-Ding Shyu, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1289 days.

This patent is subject to a terminal disclaimer.

(21) Appl. No.: 14/945,488

(22) Filed: Nov. 19, 2015

(65) Prior Publication Data
US 2017/0144331 A1 May 25, 2017

(51) Int. Cl.
*B29C 35/02* (2006.01)
*B29C 70/16* (2006.01)
*B29B 11/16* (2006.01)
*B29C 70/20* (2006.01)
*B29C 70/58* (2006.01)

(52) U.S. Cl.
CPC ............ *B29C 35/02* (2013.01); *B29B 11/16* (2013.01); *B29C 70/16* (2013.01); *B29C 70/205* (2013.01); *B29C 70/58* (2013.01)

(58) Field of Classification Search
None
See application file for complete search history.

(56) References Cited

U.S. PATENT DOCUMENTS

| 2,138,787 | A |  | 11/1938 | Gottschalk et al. |
|---|---|---|---|---|
| 2,240,185 | A |  | 4/1941 | Hennessy |
| 2,439,424 | A |  | 4/1948 | Goodloe et al. |
| 2,450,280 | A |  | 9/1948 | Homon |
| 3,449,199 | A | * | 6/1969 | Mead ..................... B29C 53/32 428/105 |

(Continued)

FOREIGN PATENT DOCUMENTS

| CN | 1382577 |  | 12/2002 |
|---|---|---|---|
| CN | 101286714 | A | 10/2008 |

(Continued)

OTHER PUBLICATIONS

Klar. "Powder Metallurgy" Metals Handbook, Desk Edition (2nd Edition). ASM Handbook. 1998. pp. 876-891. (Year: 1998).*

(Continued)

*Primary Examiner* — Paul A Wartalowicz
*Assistant Examiner* — Stephani Hill
(74) *Attorney, Agent, or Firm* — Cantor Colburn LLP (57) ABSTRACT

A method of manufacturing an elastic composite includes forming a preform from a filler filled one-dimensional elastic structure that contains a filler and a matrix material forming a pattern that provides elasticity to the one-dimensional elastic structure; and forming the elastic composite from the preform via one or more of the following: sintering; compression molding; or hot isostatic pressing.

11 Claims, 7 Drawing Sheets

(56) References Cited

U.S. PATENT DOCUMENTS

| | | | |
|---|---|---|---|
| 3,864,124 A * | 2/1975 | Breton | B01J 37/00 |
| | | | 419/10 |
| 5,660,917 A | 8/1997 | Fujimori et al. | |
| 5,861,203 A | 1/1999 | Yuan et al. | |
| 5,865,912 A * | 2/1999 | Morimoto | C22C 32/0063 |
| | | | 148/440 |
| 6,098,989 A | 8/2000 | Caplain et al. | |
| 6,352,264 B1 | 3/2002 | Dalzell, Jr. et al. | |
| 8,197,930 B1 | 6/2012 | Jacobson et al. | |
| 8,230,913 B2 | 7/2012 | Hart et al. | |
| 8,320,727 B1 | 11/2012 | Jacobsen et al. | |
| 8,354,170 B1 | 1/2013 | Henry et al. | |
| 9,527,261 B1 | 12/2016 | Roper et al. | |
| 2004/0146736 A1 * | 7/2004 | Ivanov | C22C 1/0491 |
| | | | 428/609 |
| 2005/0039992 A1 | 2/2005 | Hurwic | |
| 2005/0109502 A1 | 5/2005 | Slay et al. | |
| 2006/0080835 A1 | 4/2006 | Kooistra et al. | |
| 2009/0041609 A1 * | 2/2009 | Duz | B22F 3/24 |
| | | | 419/12 |
| 2011/0079962 A1 | 4/2011 | Munro et al. | |
| 2011/0176757 A1 | 7/2011 | Heldmann et al. | |
| 2011/0193217 A1 | 8/2011 | Meyer-Berg | |
| 2012/0031616 A1 | 2/2012 | Hall | |
| 2013/0228099 A1 | 9/2013 | Soba et al. | |
| 2013/0300066 A1 | 11/2013 | Xu et al. | |
| 2014/0148543 A1 * | 5/2014 | Roberts, III | B32B 18/00 |
| | | | 524/404 |
| 2016/0046095 A1 | 2/2016 | Clough et al. | |
| 2016/0145961 A1 | 5/2016 | Yu et al. | |
| 2016/0288200 A1 | 10/2016 | Xu et al. | |
| 2018/0119510 A1 | 5/2018 | Yu et al. | |

FOREIGN PATENT DOCUMENTS

| | | |
|---|---|---|
| CN | 201613676 U | 10/2010 |
| CN | 102433010 A | 5/2012 |
| CN | 102598892 A | 7/2012 |
| CN | 103937224 A | 7/2014 |
| CN | 103962479 | 8/2014 |
| CN | 104325652 A | 2/2015 |
| EP | 1607653 | 12/2005 |
| RU | 1785474 | 12/1992 |
| RU | 2011460 | 4/1994 |
| RU | 2195381 | 12/2002 |
| RU | 2199413 | 2/2003 |
| RU | 2208496 | 7/2003 |
| SU | 1163951 | 6/1985 |
| SU | 1210944 | 2/1986 |

OTHER PUBLICATIONS

Courtois et al., "Mechanical Properties of Monofilament Entangled Materials", Advanced Engineering Materials, vol. 14, No. 12, 2012, pp. 1128-1133.

Tan, Q., & He, G. "3D entangled wire reinforced metallic composites", Materials Science and Engineering A, 546, 233-238, 2012, pp. 1-6.

Vesenjak, Metaj, et al., "Characterization of irregular open-cell cellular structure with silicone pore filler", Polymer Testing 32 (2013) 1538-1544, pp. 1-7.

International Search Report, International Application No. PCT/2016/057068, dated Jan. 24, 2017, Korean Intellectual Property Office; International Search Report 4 pages.

Written Opinion of the International Searching Authority, International Application No. PCT/2016/057068, dated Jan. 24, 2017, Korean Intellectual Property Office; Written Opinion 9 pages.

* cited by examiner

METHODS OF MAKING HIGH TEMPERATURE ELASTIC COMPOSITES

BACKGROUND

This disclosure relates generally to methods of manufacturing high temperature elastic composites.

Metals have high corrosion resistance and excellent high pressure and high temperature tolerance. However, conventional metals are not ductile and have low elasticity, which can limit their application as seal materials. Elastomers are flexible but may break down and loose elasticity under high pressure and high temperature conditions. Thus the industry is always receptive to improved elastic materials and methods of making these materials.

BRIEF DESCRIPTION

In an embodiment, a method of manufacturing an elastic composite comprises forming a preform from a filler filled one-dimensional elastic structure that comprises a filler and a matrix material having a pattern that provides elasticity to the one-dimensional structure; and forming the elastic composite from the preform via one or more of the following: sintering; compression molding; or hot isostatic pressing.

In another embodiment, a method of manufacturing an elastic composite comprises forming a preform comprising alternating layers of a matrix layer and a filler layer; the matrix layer comprising a periodic structure network formed from a matrix material; and the filler layer comprising a filler material; molding the preform at a pressure of about 500 psi to about 50,000 psi and a molding temperature of about 20° C. to about 30° C. to form a molded product; and sintering the molded product at a sintering temperature of greater than about 150° C. and less than the melting points of both the filler material and the matrix material to provide the elastic composite.

In yet another embodiment, a method of manufacturing an elastic composite comprises forming a matrix layer from an unfilled one-dimensional elastic structure; the one-dimensional elastic structure comprising a matrix material; bending; folding; rolling; or stacking the matrix layer; combining the matrix layer with a filler material to form a preform; molding the preform at a pressure of about 500 psi to about 50,000 psi and a molding temperature of about 20° C. to about 30° C. to form a molded product; and sintering the molded product at a sintering temperature of greater than about 150° C. and less than the melting points of both the filler and the matrix material to provide the elastic composite.

BRIEF DESCRIPTION OF THE DRAWINGS

The following descriptions should not be considered limiting in any way. With reference to the accompanying drawings, like elements are numbered alike:

FIGS. 3A-3C illustrate filler filled one-dimensional elastic structures according to various embodiments of the disclosure wherein in FIG. 3A the structure comprises a spring wound around a filler rod; in FIG. 3B, the filler is in the form of a powder; and in FIG. 3C, the filler comprises pellets;

DETAILED DESCRIPTION

Disclosed are methods of manufacturing elastic composites having improved balanced properties including excellent elasticity, high temperature rating, high corrosion resistance, and/or high extrusion resistance.

In an embodiment, a method of manufacturing an elastic composite comprises forming a preform from a filler filled one-dimensional elastic structure. The one-dimensional structure comprises a filler and a matrix material having a pattern that provides elasticity to the one-dimensional structure. By using a filler filled one-dimensional structure, the method allows for uniform distribution of fillers throughout the elastic composite.

As used herein, the phrase "one-dimensional structure" refers to a structure that can extend continuously in one direction. An elastic structure means that the structure has greater than about 50% elastic deformation, greater than about 80% elastic deformation, greater than about 100% elastic deformation, or greater than about 200% of elastic deformation. A percentage of elastic deformation can be calculated by ΔL/L, where ΔL is the recoverable change in a dimension as a result of a tensile or compressive stress, and L is the original dimension length.

The one-dimensional elastic structure comprises a matrix material and can be formed from a wire. The wire can have a diameter of about 0.08 to about 0.5 mm. The cross-section of the matrix wire is not particularly limited. Exemplary cross-sections include circle, triangle, rectangle, square, oval, star and the like. The wire can be hollow.

Figure 1A:
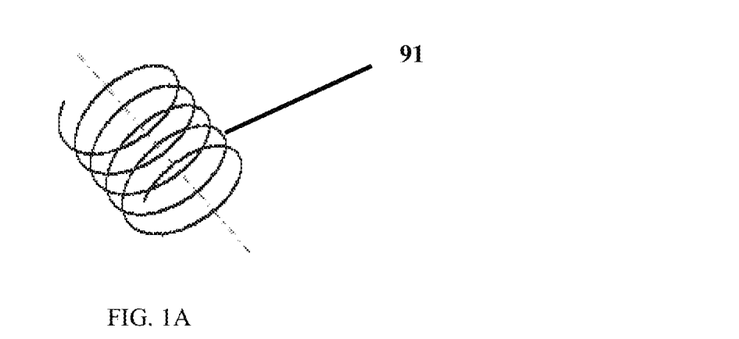
FIGS. 1A-1C illustrate unfilled one-dimensional elastic structures according to some embodiments of the disclosure, wherein in FIGS. 1A-1C the elastic structures comprise coils having a shape of circle, square, and triangle respectively.
Figure 1B:
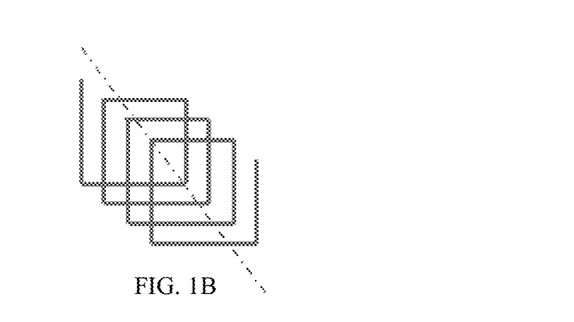
Figure 1C:
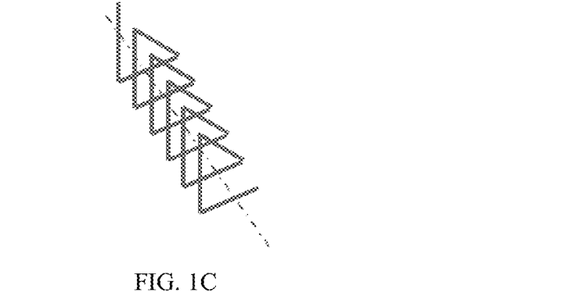
Figure 2A:
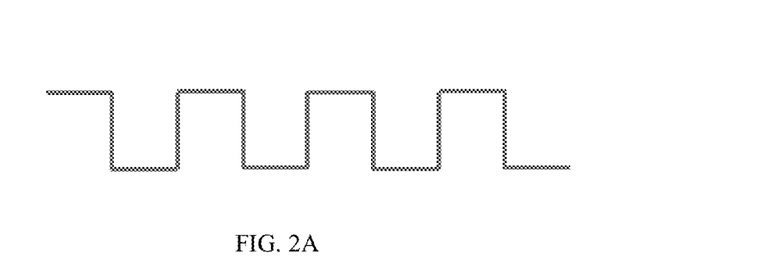
FIGS. 2A-2C illustrate exemplary unfilled one-dimensional elastic structures according to other embodiments of the disclosure.
Figure 2B:
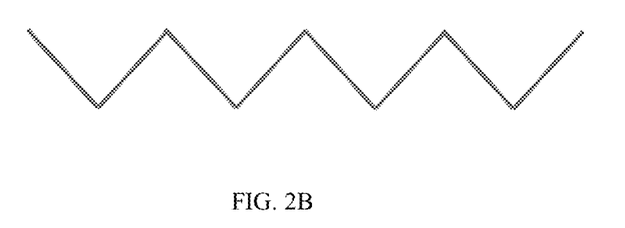
Figure 2C:
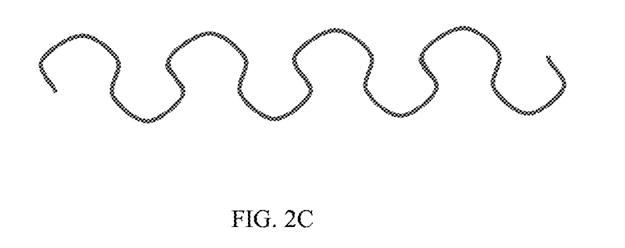

The patterns of the one-dimensional elastic structure are not particularly limited as long as they provide the desired elasticity. Exemplary patterns include springs as shown in FIGS. 1A-1C. The shapes of the coils of the springs are not particularly limited. In FIGS. 1A-1C the coils of the springs have a shape of circle, square, and triangle respectively. Other shapes are contemplated. The pattern can also have a planar structure as illustrated in FIGS. 2A-2C.

In a specific embodiment, the one-dimensional elastic structure comprises a spring. The spring can have an average spring pitch of about 10 to about 15 times of the wire diameter, where the pitch of a spring refers to the distance from the center of one coil to the center of the adjacent coil. The average spring diameter is also about 10 to about 15 times of the wire diameter. As used herein, spring diameter refers to the outside diameter of the coil minus one wire diameter (d). Such a spring diameter is also commonly known as mean coil diameter. In an embodiment, the springs have an average spring pitch of about 0.8 to about 7.5 mm and an average spring diameter of about 0.8 to about 7.5 mm. The springs can have a density of about 0.2 to about 4 g/cm$^3$. In an exemplary embodiment, the springs are hollow members that have a wall thickness ranging from tens of nanometers to tens of microns (10 nanometers to 90 microns). In certain embodiments, the springs are solid members.

Figure 3A:
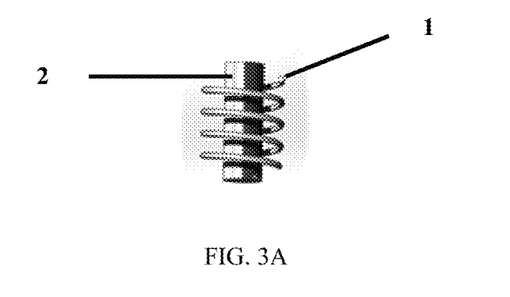
Figure 3B:
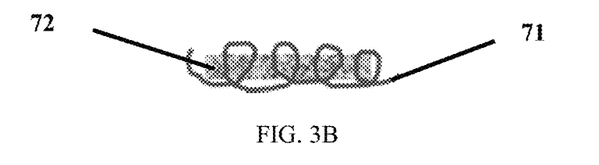
Figure 3C:
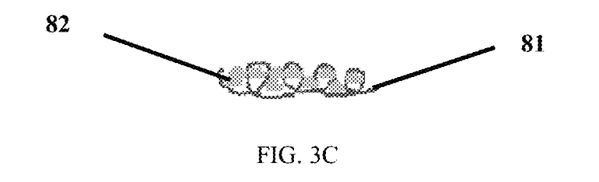

The form and shape of the fillers are not particularly limited. The fillers can comprise a solid piece in the form of a tube, a rod, or the like. The fillers can also be in the form of a coating, a powder or pellets. FIGS. 3A-3C illustrate filler filled one-dimensional elastic structures according to various embodiments of the disclosure. In FIG. 3A the filled one-dimensional elastic structure comprises a spring 1 wound around a filler rod 2; in FIG. 3B, the filler 72 is in the form of a powder disposed inside the coils of a spring 71; and in FIG. 3C, the filler 82 comprises pellets disclosed inside the coils of a spring 81.

In an embodiment, the one-dimensional elastic structure at least partially encompasses the filler. For example, the filler can occupy the entire open space inside the coils of the springs or occupy a portion of the open space insider the coils of the springs. The filler can be in partial, full, or no contact with the one-dimensional elastic structure. In another embodiment, the filler is coated on the one-dimensional elastic structure.

Figure 4:
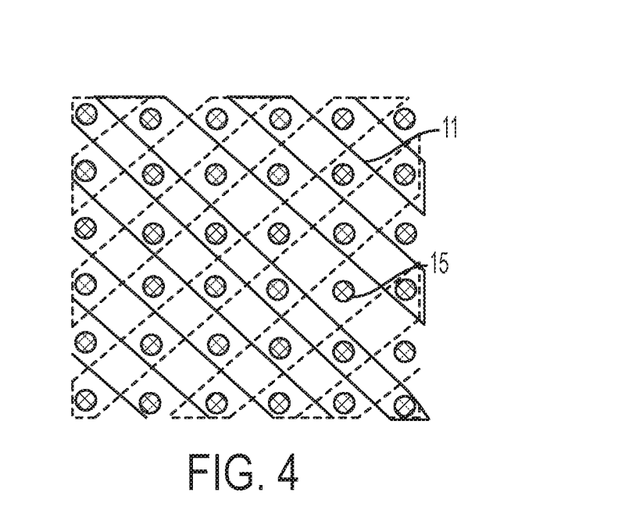
FIG. 4 illustrates a method of preparing a filled sheet according to an embodiment of the disclosure.
Figure 5:
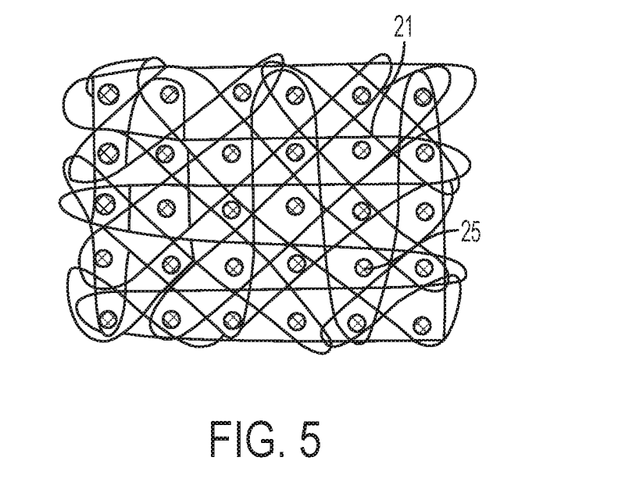
FIG. 5 illustrates a method of preparing a filled sheet according to another embodiment of the disclosure.

The filler filled one-dimensional elastic structure can be used to form a filled sheet. The method is not particularly limited and includes bending, stacking, aligning, knotting the one-dimensional elastic structures, or a combination comprising at least one of the foregoing. FIG. 4 illustrates a method of preparing a filled sheet according to an embodiment of the disclosure; and FIG. 5 illustrates a method of preparing a filled sheet according to another embodiment of the disclosure. In FIG. 4, one-dimensional elastic structure 11 is wound around pin 15 according to a preset pattern to form a filled sheet. In FIG. 5, a one-dimensional elastic structure 21 is wound around pin 25 according to another preset pattern to form a filled sheet. Pins can be removed after the filled sheets are formed.

Similar to the composite orientation labeling, a standard orientation code can be used to define the orientations of the elastic structures. In the instant where the one-dimensional elastic structure comprises springs, the orientation code denotes the angle, in degrees, between the spring coil axial direction and the "X" axis of an article made from the elastic composite. The "X" axis of the article can be a randomly chosen reference axis. The springs may be orientated in any angles with respect to the X-axis (0°).

Figure 6A:
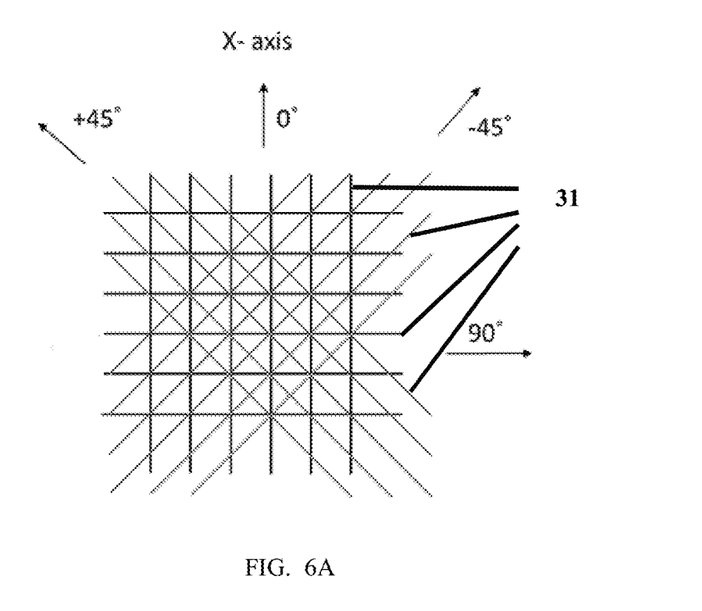
FIG. 6A illustrates the orientations of springs in a filled sheet at 0°, +45°, −45°, and 90°.
Figure 6B:
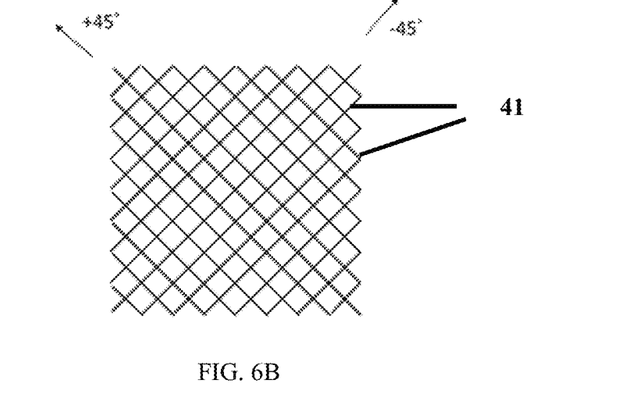
FIG. 6B illustrates the orientations of springs in a filled sheet at +45° and −45°.
Figure 6C:
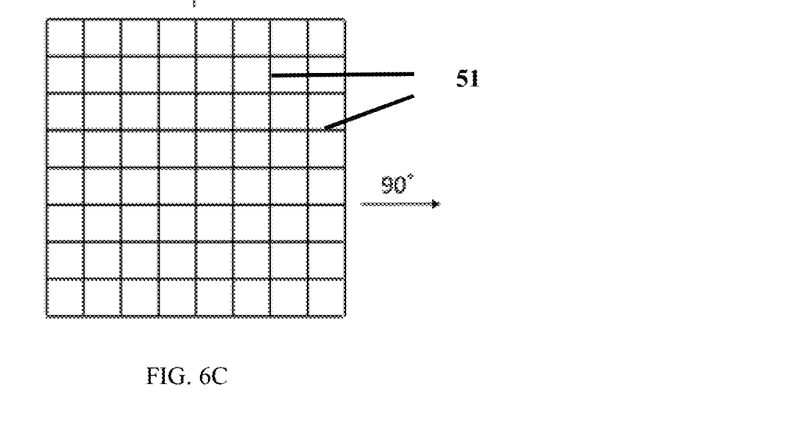
FIG. 6C illustrates the orientations of springs in a filled sheet at 0° and 90°.
Figure 6D:
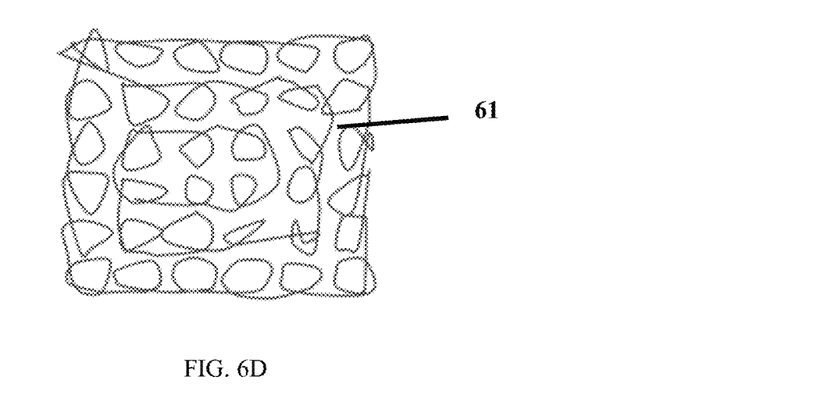
FIG. 6D illustrates random orientated springs in a filled sheet.

In an embodiment, the filler filled one-dimensional spring in a given filled sheet is oriented in the same direction. In another embodiment, the filler filled one-dimensional spring in a given filled sheet is oriented in more than one direction. For example in FIGS. 6A, 6B and 6C, the spring orientations are denoted as [0, 90, +45, −45], [+45,−45], and [0, 90] respectively, where the orientations are separated by comma a (,). The plus (+) and minus (−) angles are relative to the "X" axis. Plus (+) signs are to the left of zero, and minus ( ) signs are to the right of zero. In these figures, straight lines 31, 41, and 51 represent filler filled springs. The springs (61) may also be laid in random directions within one sheet, as shown in FIG. 6D.

The filled sheets can be used to form the preform. Methods are not particularly limited and include bending, folding, or rolling the filled sheet, stacking multiple filled sheets together or a combination comprising at least one of the foregoing.

Figure 7A:
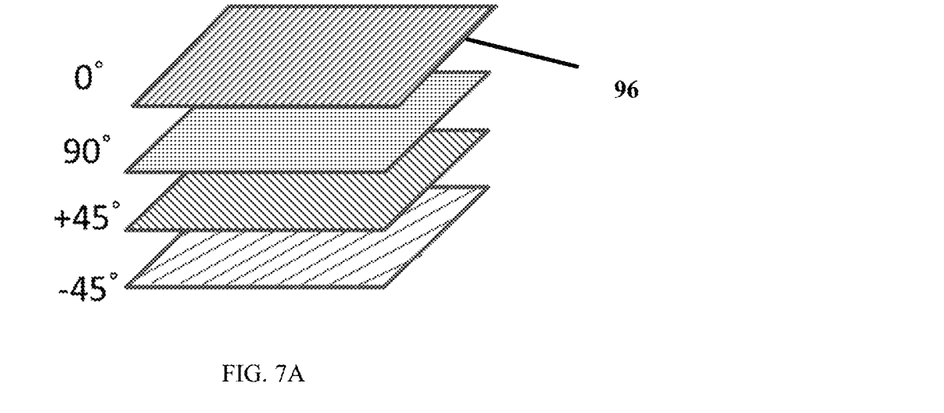
FIG. 7A illustrates multiple layers of filled sheets with a first layer having springs oriented at 0°, a second layer having springs oriented at 90°; a third layer having springs oriented at +45°, and a fourth layer having springs oriented at −45°.
Figure 7B:
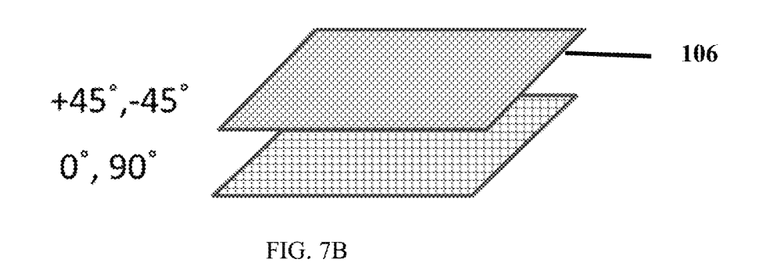
FIG. 7B illustrates multiple layers of filled sheets with a first layer having springs oriented at +45° and −45°; and a second layer having springs oriented at 0° and 90°.

When multiple filled sheets are stacked together, the filler filled one-dimensional elastic structures in each layer can have the same or different orientation profiles. FIG. 7A illustrates a preform containing four layers of filled sheets (96) containing springs orientated at 0° C., 90°, +45° and −45° respectively in each layer. FIG. 7B illustrates a preform containing two layers of filled sheets (106) where the top layer contains springs orientated at +45° and −45° and the bottom layer contains springs oriented at 0° and 90°.

Figure 8A:
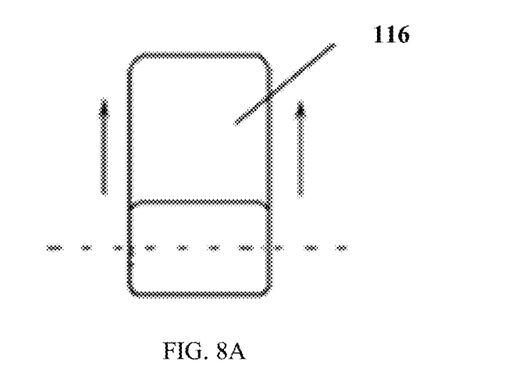
FIG. 8A illustrates a method of making a preform from a filled sheet according to an embodiment of the disclosure.
Figure 8B:
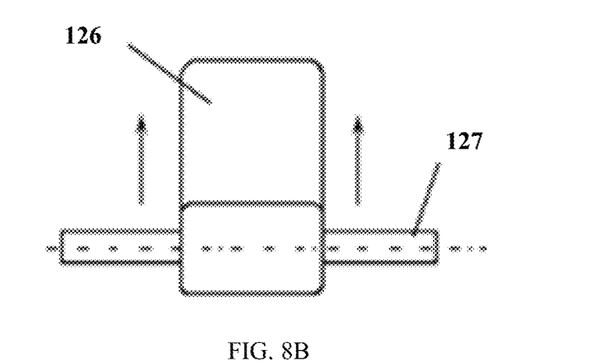
FIG. 8B illustrates a method of making a preform from a filled sheet according to another embodiment of the disclosure.

As shown in FIGS. 8A and 8B, the filled sheet 116 or 126 can be rolled along the arrow direction to form the preform, except that the method illustrated in FIG. 8A does not have a mandrel whereas the method illustrated in FIG. 8B uses a mandrel 127.

Although the preformed can be formed from a filled sheet, which is in turn formed from a filler filled one-dimensional elastic structure, it is appreciated that the preform can be formed directly from the filler filled one-dimensional structure without forming a filled sheet first. The method is not particularly limited and includes bending, knotting, stacking the filler filled one-dimensional elastic structure and the like.

In another embodiment, a method of manufacturing an elastic composite comprises forming a preform comprising alternating layers of a matrix layer and a filler layer; the matrix layer comprising a periodic structure network formed from a matrix material; and the filler layer comprising a filler material; molding the preform to form a molded product; and sintering the molded product to provide the elastic composite.

The matrix layer can be formed from a filler filled one-dimensional elastic structure as described herein or an unfilled one-dimensional elastic structure, or a combination thereof. In an embodiment, the unfilled one-dimensional elastic structures can have the same average spring pitch, same average spring diameter, and same wire diameter as the springs described herein in the context of filler filled one-dimensional elastic structure. Methods to form the matrix layer are not particularly limited and includes bending, aligning, stacking, knotting the one-dimensional elastic structures, or a combination comprising at least one of the foregoing. Methods illustrated in FIGS. 4 and 5 can also be used to make matrix layers. In a specific embodiment, the periodic structure network comprises periodic springs.

The orientations of the springs in one matrix layer as well as the orientations of springs in different matrix layers can be the same as described herein in the context of the filled sheets and the preforms made from filler filled one-dimensional elastic structures. The terms layers and sheets are used interchangeably herein.

Figure 9:
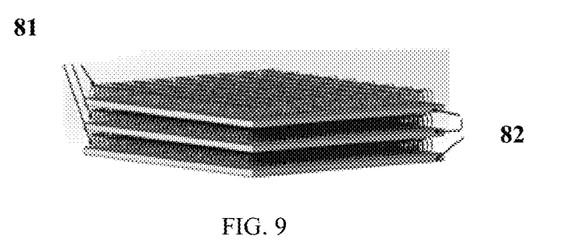
FIG. 9 illustrates a preform containing alternating layers of a matrix layer and a filler layer.

As used herein, alternating layers of a matrix layer and a filler layer comprise at least one matrix layer and at least one filler layer. One exemplary preform is illustrated in FIG. 9, which contains multiple matrix layers 81 and multiple filler layers 82. The preform can be used directly in the molding and sintering process. Alternatively the preform can be further rolled, folded, or bended before it is compressed and sintered. If desirable, additional filler can be impregnated into the preform.

In another embodiment, a method of manufacturing an elastic composite comprises forming a matrix layer from an unfilled one-dimensional elastic structure; bending; folding; rolling; or stacking the matrix layer; and combining the matrix layer with a filler material to form a preform. It is appreciated that the filler can be in the form of a powder, gel, liquid and the like. The filler can be combined with the matrix material before the matrix layer is further bended, folded, rolled, or stacked or after the matrix layer is bended, folded, rolled, or stacked. The combination method includes impregnation, infiltration, or other processes known in the art.

The preform can be compression molded, sintered, and/or hot isostatic pressed to form the elastic composite. In an embodiment, the method comprises molding the preform to provide a molded product; and sintering the molded product to form the elastic composite. Molding is conducted at a pressure of about 500 psi to about 50,000 psi and a molding temperature of about 20° C. to about 30° C. Sintering is carried out at a temperature greater than about 150° C. but lower than the melting points of the filler material and the matrix material. A pressure of about 500 psi to about 50,000 psi is optionally applied during the sintering process.

Optionally the method further comprises heating the elastic composite at an elevated temperature and atmospheric pressure to release residual stress. In an embodiment, the heating temperature is about 20 to 50° C. lower than the sintering temperature to make the elastic composite. In the instance where the filler is a polymer, the post treatment temperature is about 20° C. to about 300° C. or about 20° C. to about 200° C.

As used herein, a "matrix material" refers to a material that forms a pattern or structure providing elasticity to the composite. The matrix material comprises one or more of the following: a metal; a metal alloy; a carbide; or a polymer. In an embodiment, the matrix material comprises a metal or a corrosion resistant metal alloy. Exemplary matrix material includes one or more of the following: an iron alloy, a nickel-chromium based alloy, a nickel alloy, copper, or a shape memory alloy. An iron alloy includes steel such as stainless steel. Nickel-chromium based alloys include INCONEL. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel alloy includes HASTELLOY. Hastelloy is a trademarked name of Haynes International, Inc. As used herein, Hastelloy can be any of the highly corrosion-resistant superalloys having the "Hastelloy" trademark as a prefix. The primary element of the HASTELLOY group of alloys referred to in the disclosure is nickel; however, other alloying ingredients are added to nickel in each of the subcategories of this trademark designation and include varying percentages of the elements molybdenum, chromium, cobalt, iron, copper, manganese, titanium, zirconium, aluminum, carbon, and tungsten. Shape memory alloy is an alloy that "remembers" its original shape and that when deformed returns to its pre-deformed shape when heated. Exemplary shape memory alloys include Cu—Al—Ni based alloys, Ni—Ti based alloys, Zn—Cu—Au—Fe based alloys, and iron-based and copper-based shape memory alloys, such as Fe—Mn—Si, Cu—Zn—Al and Cu—Al—Ni.

Exemplary polymers for the matrix material include elastomers such as acrylonitrile butadiene rubber (NBR); hydrogenated nitrile butadiene (HNBR); acrylonitrile butadiene carboxy monomer (XNBR); ethylene propylene diene monomer (EPDM); fluorocarbon rubber (FKM); perfluorocarbon rubber (FFKM); tetrafluoro ethylene/propylene rubbers (FEPM); silicone rubber and polyurethane (PU); thermoplastics such as nylon, polyethylene (PE), polytetrafluoroethylene (PTFE); perfluoroalkoxy alkane (PFA), polyphenylene sulfide (PPS) polyether ether ketone (PEEK); polyphenylsulfone (PPSU); polyimide (PI), polyethylene tetraphthalate (PET) or polycarbonate (PC).

Exemplary carbides for the matrix material include a carbide of aluminum, titanium, nickel, tungsten, chromium, iron, an aluminum alloy, a copper alloy, a titanium alloy, a nickel alloy, a tungsten alloy, a chromium alloy, or an iron alloy, SiC, $B_4C$.

Advantageously, the filler materials may enhance the sealing characteristics of the elastic structures such as metal springs while providing additional strength and rigidity. The filler materials can have similar or complimentary elastic properties of the elastic structures such as metal springs. Optionally the filler material has a high temperature rating. The filler materials in the elastic composites comprise a carbon composite; a polymer; a metal; graphite; cotton; asbestos; or glass fibers. Although there may be overlaps between the materials that can be used as a filler and a matrix material, it is appreciated that in a given elastic composite, the filler and the matrix material are compositionally different. Combinations of the materials can be used. The filler material can be a sintered material or a non-sintered material. Optionally the filler materials contain reinforcement fibers, the reinforcement fibers being oriented in short, long, or continuous fibers, beads, or balloons. The volume ratio between the filler material and the metal matrix can vary depending on the applications. In an embodiment, the volume ratio of the matrix material relative to the filler material is about 2.5%:97.5% to about 80%:20%, about 5%:95% to about 70%:30%, or about 10%:90% to about 60%:40%.

When the filler material is a carbon composite, the elastic composite can have a temperature rating of greater than about 600° C. Carbon composites contain carbon and an inorganic binder. The carbon can be graphite such as natural graphite; synthetic graphite; expandable graphite; or expanded graphite; or a combination comprising at least one of the foregoing.

In an embodiment, the carbon composites comprise carbon microstructures having interstitial spaces among the carbon microstructures; wherein the binder is disposed in at least some of the interstitial spaces. The interstitial spaces among the carbon microstructures have a size of about 0.1 to about 100 microns, specifically about 1 to about 20 microns. A binder can occupy about 10% to about 90% of the interstitial spaces among the carbon microstructures.

The carbon microstructures can also comprise voids within the carbon microstructures. The voids within the carbon microstructures are generally between about 20 nanometers to about 1 micron, specifically about 200 nanometers to about 1 micron. As used herein, the size of the voids or interstitial spaces refers to the largest dimension of the voids or interstitial spaces and can be determined by high resolution electron or atomic force microscope technology. In an embodiment, to achieve high strength, the voids within the carbon microstructures are filled with the binder or a derivative thereof. Methods to fill the voids within the carbon microstructures include vapor deposition.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 g/cm$^3$, or about 0.1 to about 2 g/cm$^3$.

In the carbon composites, the carbon microstructures are held together by a binding phase. The binding phase comprises a binder that binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bounded by mechanical interlocking. The thickness of the binding phase is about 0.1 to about 100 microns or about 1 to about 20 microns. The binding phase can form a continuous or discontinuous network that binds carbon microstructures together.

Exemplary binders include a nonmetal, a metal, an alloy, or a combination comprising at least one of the foregoing. The nonmetal is one or more of the following: $SiO_2$; Si; B; or $B_2O_3$. The metal can be at least one of aluminum; copper; titanium; nickel; tungsten; chromium; iron; manganese; zirconium; hafnium; vanadium; niobium; molybdenum; tin; bismuth; antimony; lead; cadmium; or selenium. The alloy includes one or more of the following: aluminum alloys; copper alloys; titanium alloys; nickel alloys; tungsten alloys; chromium alloys; iron alloys; manganese alloys; zirconium alloys; hafnium alloys; vanadium alloys; niobium alloys; molybdenum alloys; tin alloys; bismuth alloys; antimony alloys; lead alloys; cadmium alloys; or selenium alloys. In an embodiment, the binder comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as Inconel®, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

The binder used to make the carbon composite is micro- or nano-sized. In an embodiment, the binder has an average particle size of about 0.05 to about 250 microns, about 0.05 to about 100 microns, about 0.05 to about 50 microns, or about 0.05 to about 10 microns. Without wishing to be bound by theory, it is believed that when the binder has a size within these ranges, it disperses uniformly among the carbon microstructures.

When an interface layer is present, the binding phase comprises a binder layer comprising a binder and an interface layer bonding one of the at least two carbon microstructures to the binder layer. In an embodiment, the binding phase comprises a binder layer, a first interface layer bonding one of the carbon microstructures to the binder layer, and a second interface layer bonding the other of the at least two microstructures to the binder layer. The first interface layer and the second interface layer can have the same or different compositions.

The interface layer comprises one or more of the following: a C-metal bond; a C—B bond; a C—Si bond; a C—O—Si bond; a C—O-metal bond; or a metal carbon solution. The bonds are formed from the carbon on the surface of the carbon microstructures and the binder.

In an embodiment, the interface layer comprises carbides of the binder. The carbides include one or more of the following: carbides of aluminum; carbides of titanium; carbides of nickel; carbides of tungsten; carbides of chromium; carbides of iron; carbides of manganese; carbides of zirconium; carbides of hafnium; carbides of vanadium; carbides of niobium; or carbides of molybdenum. These carbides are formed by reacting the corresponding metal or metal alloy binder with the carbon atoms of the carbon microstructures. The binding phase can also comprise SiC formed by reacting $SiO_2$ or Si with the carbon of carbon microstructures, or $B_4C$ formed by reacting B or $B_2O_3$ with the carbon of the carbon microstructures. When a combination of binder materials is used, the interface layer can comprise a combination of these carbides. The carbides can be salt-like carbides such as aluminum carbide, covalent carbides such as SiC and $B_4C$, interstitial carbides such as carbides of the group 4, 5, and 6 transition metals, or intermediate transition metal carbides, for example the carbides of Cr, Mn, Fe, Co, and Ni.

In another embodiment, the interface layer comprises a solid solution of carbon such as graphite and a binder. Carbon has solubility in certain metal matrix or at certain temperature ranges, which can facilitate both wetting and binding of a metal phase onto the carbon microstructures. Through heat-treatment, high solubility of carbon in metal can be maintained at low temperatures. These metals include one or more of Co; Fe; La; Mn; Ni; or Cu. The binder layer can also comprise a combination of solid solutions and carbides.

The carbon composites comprise about 20 to about 95 wt. %, about 20 to about 80 wt. %, or about 50 to about 80 wt. % of carbon, based on the total weight of the composites. The binder is present in an amount of about 5 wt. % to about 75 wt. % or about 20 wt. % to about 50 wt. %, based on the total weight of the composites. In the carbon composites, the weight ratio of carbon relative to the binder is about 1:4 to about 20:1, or about 1:4 to about 4:1, or about 1:1 to about 4:1.

The carbon composites can optionally comprise a reinforcing agent. Exemplary reinforcing agent includes one or more of the following: carbon fibers; carbon black; mica; clay; glass fibers; ceramic fibers; or ceramic hollow structures. Ceramic materials include SiC, $Si_3N_4$, $SiO_2$, BN, and the like. The reinforcing agent can be present in an amount of about 0.5 to about 10 wt. % or about 1 to about 8%, based on the total weight of the carbon composite.

Filler materials other than carbon composites can also be used in the elastic composites of the disclosure. Other suitable filler materials for the elastic composites include a soft metal, soft metal alloy, or a combination comprising one or more of the foregoing. Exemplary metals for the filler material include one or more of the following: aluminum; copper; lead; bismuth; gallium; cadmium; silver; gold; rhodium; thallium; tin; alloys thereof; or a eutectic alloy. A eutectic alloy is one for which the melting point is as low as possible and all the constituents of the alloy crystallize simultaneously at this temperature from the liquid state.

The filler materials for the elastic composites can also be a polymer such as a thermosetting polymer, a thermoplastic polymer or a combination comprising at least one of the foregoing. As used herein, polymers include both synthetic polymers and natural polymers. Polymers also include crosslinked polymers. When the filler material is a polymer, the elastic composite can have a recoverable deformation of greater than about 30%.

Exemplary polymers for the filler material include elastomers such as acrylonitrile butadiene rubber (NBR); hydrogenated nitrile butadiene (HNBR); acrylonitrile butadiene carboxy monomer (XNBR); ethylene propylene diene monomer (EPDM); fluorocarbon rubber (FKM); perfluorocarbon rubber (FFKM); tetrafluoro ethylene/propylene rubbers (FEPM); silicone rubber and polyurethane (PU); thermoplastics such as nylon, polyethylene (PE), polytetrafluoroethylene (PTFE); perfluoroalkoxy alkane (PFA), polyphenylene sulfide (PPS) polyether ether ketone (PEEK); polyphenylsulfone (PPSU); polyimide (PI), polyethylene tetraphthalate (PET) or polycarbonate (PC). In a specific embodiment, the filler comprises polytetrafluoroethylene.

The filler materials are bounded to the matrix materials/structures via mechanical interlocking; or chemical bonding; either directly or through an active interface layer between the surfaces of the matrix materials/structures and the filler materials. As used herein, the term "matrix structures" refer to the structures formed from the matrix materials. The binding between matrix materials/structures and filler materials facilitates transferring loads between the matrix and the filler. Advantageously, optimum binding allows for compatibility and integrity of the different materials of matrix and the filler under loading conditions. Weak interfacial bounding may not be sufficient for load distribution and transformation as delamination or cracks may occur and destroy the integrity of the composite, while excessive interfacial bounding may lead to a rigid composite, which compromises the elasticity of the matrix.

When the filler materials comprise a carbon composite or a metal, the filler materials can be bounded to the matrix materials/structures via at least one of a solid solution or intermetallic compounds formed between the metal in the matrix material and the metal in the filler material. Advantageously, a solid solution is formed providing robust binding between the filler material and the matrix material. When the filler materials comprise a polymer, the filler materials can be bounded to the matrix material/structure through mechanical interlocking.

The elastic composites are useful for preparing articles for a wide variety of applications. The elastic composites may be used to form all or a portion of an article. Exemplary articles have been described for example in copending application Ser. No. 14/676,864.

Further included in this disclosure are the following specific embodiments, which do not necessarily limit the claims.

Embodiment 1

A method of manufacturing an elastic composite, the method comprising: forming a preform from a filler filled one-dimensional elastic structure that comprises a filler and a matrix material, the matrix material forming a pattern that provides elasticity to the one-dimensional elastic structure; and forming the elastic composite from the preform via one or more of the following: sintering; compression molding; or hot isostatic pressing.

Embodiment 2

The method of Embodiment 1, wherein the filler filled one-dimensional elastic structure has an elastic deformation of greater than about 50%.

Embodiment 3

The method of Embodiment 1 or Embodiment 2, wherein the filler is coated on the one-dimensional elastic structure.

Embodiment 4

The method of any one of Embodiments 1 to 3, wherein the filler filled one-dimensional structure comprises a spring at least partially encompassing the filler.

Embodiment 5

The method of Embodiment 1 or Embodiment 2, wherein the filler is in the form of one or more of the following: rods; tubes; powders; or pellets.

Embodiment 6

The method of any one of Embodiments 1 to 5, wherein forming the preform comprises forming a filled sheet from the one-dimensional elastic structure; and forming the preform from the filled sheet.

Embodiment 7

The method of Embodiment 6, wherein forming the preform from the filled sheet comprises bending, folding, or rolling the filled sheet, stacking multiple filled sheets or a combination comprising at least one of the foregoing.

Embodiment 8

The method of any one of Embodiments 1 to 7, wherein forming the elastic composite from the preform comprises molding the preform at a pressure of about 500 psi to about 50,000 psi and a molding temperature of about 20° C. to about 30° C. to provide a molded product; and sintering the molded product at a sintering temperature of greater than about 150° C. and less than the melting points of both the filler and the matrix material to form the elastic composite.

Embodiment 9

The method of any one of Embodiments 1 to 8, further comprising heating the elastic composite at a temperature of about 20° C. to about 500° C. lower than the sintering temperature and an atmospheric pressure to release residual stress.

Embodiment 10

The method of any one of Embodiments 1 to 9, wherein the filler comprises one or more of the following: a carbon composite; a polymer; a metal; graphite; cotton; asbestos; or glass fiber.

Embodiment 11

The method of any one of Embodiments 1 to 10, wherein the filler comprises one or more of the following: a acrylonitrile butadiene rubber; hydrogenated nitrile butadiene; acrylonitrile butadiene carboxy monomer; ethylene propylene diene monomer; fluorocarbon rubber; perfluorocarbon rubber; tetrafluoro ethylene/propylene rubber; silicone rubber; polyurethane; nylon; polyethylene; polytetrafluoroethylene; perfluoroalkoxy alkane; polyphenylene sulfide; polyether ether ketone; polyphenylsulfone; polyimide, polyethylene tetraphthalate; or polycarbonate.

Embodiment 12

The method of any one of Embodiments 1 to 11, wherein the matrix material comprises one or more of the following: a metal; a metal alloy; a ceramic material; or a polymer.

Embodiment 13

A method of manufacturing an elastic composite, the method comprising: forming a preform comprising alternating layers of a matrix layer and a filler layer; the matrix layer comprising a periodic structure network formed from a matrix material; and the filler layer comprising a filler material; molding the preform at a pressure of about 500 psi to about 50,000 psi and a molding temperature of about 20° C. to about 30° C. to form a molded product; and sintering the molded product at a sintering temperature of greater than about 150° C. and less than the melting points of both the filler material and the matrix material to provide the elastic composite.

Embodiment 14

The method of Embodiment 13, wherein the periodic structure network comprises periodic springs oriented in the same direction in a given matrix layer.

Embodiment 15

The method of Embodiment 13, wherein the periodic structure network comprises periodic springs oriented in more than one direction in a given matrix layer.

Embodiment 16

The method of any of Embodiments 13 to 15, wherein the periodic structure network comprises filler filled elastic structures, unfilled elastic structures, or a combination comprising at least one of the foregoing.

Embodiment 17

The method of any one of Embodiments 13 to 16, further comprising heating the elastic composite at a temperature that is 20 to 500° C. lower than the sintering temperature to release residual stress.

Embodiment 18

The method of any one of Embodiments 13 to 17, wherein the matrix material comprise one or more of the following: a metal; a metal alloy; a ceramic material; or a polymer.

Embodiment 19

The method of any one of Embodiments 13 to 18, wherein the filler material comprises one or more of the following: a carbon composite; a polymer; a metal; graphite; cotton; asbestos; or glass fiber.

Embodiment 20

The method of any one of Embodiments 13 to 19, wherein the filler material comprises one or more of the following: a acrylonitrile butadiene rubber; hydrogenated nitrile butadiene; acrylonitrile butadiene carboxy monomer; ethylene propylene diene monomer; fluorocarbon rubber; perfluorocarbon rubber; tetrafluoro ethylene/propylene rubber; silicone rubber; polyurethane; nylon; polyethylene; polytetrafluoroethylene; perfluoroalkoxy alkane; polyphenylene sulfide; polyether ether ketone; polyphenylsulfone; polyimide, polyethylene tetraphthalate; or polycarbonate.

Embodiment 21

A method of manufacturing an elastic composite, the method comprising: forming a matrix layer from an unfilled one-dimensional elastic structure; the unfilled one-dimensional elastic structure comprising a matrix material; bending; folding; rolling; or stacking the matrix layer; combining the matrix layer with a filler material to form a preform; molding the preform at a pressure of about 500 psi to about 50,000 psi and a molding temperature of about 20° C. to about 30° C. to form a molded product; and sintering the molded product at a sintering temperature of greater than about 150° C. and less than the melting points of both the filler core and the elastic structure to provide the elastic composite.

All ranges disclosed herein are inclusive of the endpoints, and the endpoints are independently combinable with each other. "Or" means "and/or." The modifier "about" used in connection with a quantity is inclusive of the stated value and has the meaning dictated by the context (e.g., it includes the degree of error associated with measurement of the particular quantity). All references are incorporated herein by reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of manufacturing an elastic composite, the method comprising:
forming a preform from a filler filled one-dimensional elastic structure that comprises a filler and a wire comprising a matrix material, the wire forming a pattern that provides elasticity to the one-dimensional elastic structure, the matrix material comprising one or more of the following: a metal; a metal alloy; or a ceramic material, and the filler comprising a carbon composite and optionally one or more of the following: a polymer; a metal; graphite; cotton; asbestos; or glass fiber, the carbon composite comprising carbon microstructures having an aspect ratio of about 10 to about 500, and a binder disposed in interstitial spaces among the carbon microstructures; and
forming the elastic composite from the preform via one or more of the following: sintering; compression molding; or hot isostatic pressing,
wherein the filler filled one-dimensional elastic structure has an elastic deformation of greater than about 50%.

2. The method of claim 1, wherein the filler is coated on the wire.

3. The method of claim 1, wherein the pattern is a spring.

4. The method of claim 1, wherein the filler is in the form of one or more of the following: rods; tubes; powders; or pellets.

5. The method of claim 1, wherein forming the preform comprises forming a filled sheet from the one-dimensional elastic structure; and forming the preform from the filled sheet.

6. The method of claim 5, wherein forming the preform from the filled sheet comprises one or more of the following: bending, folding, or rolling the filled sheet, or stacking multiple filled sheets.

7. The method of claim 1, wherein forming the elastic composite from the preform comprises
molding the preform at a pressure of about 500 psi to about 50,000 psi and a molding temperature of about 20° C. to about 30° C. to provide a molded product; and
sintering the molded product at a sintering temperature of greater than about 150° C. and less than the melting points of both the filler and the matrix material to form the elastic composite.

8. The method of claim 7, further comprising heating the elastic composite at a temperature of about 20° C. to about 500° C. lower than the sintering temperature and an atmospheric pressure to release residual stress.

9. The method of claim 1, wherein the filler comprises the carbon composite and the polymer, and the polymer comprises one or more of the following: a acrylonitrile butadiene rubber; hydrogenated nitrile butadiene; acrylonitrile butadiene carboxy monomer; ethylene propylene diene monomer; fluorocarbon rubber; perfluorocarbon rubber; tetrafluoro ethylene/propylene rubber; silicone rubber; polyurethane; nylon; polyethylene; polytetrafluoroethylene; perfluoroalkoxy alkane; polyphenylene sulfide; polyether ether ketone; polyphenylsulfone; polyimide, polyethylene tetraphthalate; or polycarbonate.

10. The method of claim 1, wherein the matrix material comprises one or more of the following: the metal; or the metal alloy.

11. The method of claim 1, wherein the binder in the carbon microstructure comprises one or more of the following: a nonmetal, a metal, an alloy of the metal, the non-metal is one or more of the following: $SiO_2$; Si; B; or $B_2O_3$ and the metal is at least one of aluminum; copper; titanium; nickel; tungsten; chromium; iron; manganese; zirconium; hafnium; vanadium; niobium; molybdenum; tin; bismuth; antimony; lead; cadmium; or selenium.

* * * * *